United States Patent
Scott et al.

(10) Patent No.: US 8,794,263 B2
(45) Date of Patent: Aug. 5, 2014

(54) FILTER ASSEMBLY

(75) Inventors: Simon Peter Scott, Staffordshire (GB); Christopher Sutcliffe, Liverpool (GB)

(73) Assignee: MTT Technologies Limited (GB)

( * ) Notice: Subject to any disclaimer, the term of this patent is extended or adjusted under 35 U.S.C. 154(b) by 269 days.

(21) Appl. No.: 13/062,676

(22) PCT Filed: Sep. 7, 2009

(86) PCT No.: PCT/GB2009/002146
§ 371 (c)(1), (2), (4) Date: May 27, 2011

(87) PCT Pub. No.: WO2010/026396
PCT Pub. Date: Mar. 11, 2010

(65) Prior Publication Data
US 2011/0265893 A1    Nov. 3, 2011

(30) Foreign Application Priority Data
Sep. 5, 2008 (GB) .................. 0816310.7

(51) Int. Cl.
G06F 19/00 (2011.01)
(52) U.S. Cl.
USPC ...... 137/599.14; 264/113; 264/497; 700/119; 96/223
(58) Field of Classification Search
CPC ......... B01D 61/20; B01D 61/22; B01D 61/18
USPC ........ 137/588.14, 599.14; 210/340, 341, 411; 700/118, 119; 264/113, 125, 497, 642; 96/223; 95/281
See application file for complete search history.

(56) References Cited

U.S. PATENT DOCUMENTS

| | | | |
|---|---|---|---|
| 4,080,431 A | 3/1978 | Moss | |
| 4,863,538 A | 9/1989 | Deckard | |
| 4,923,068 A * | 5/1990 | Crowson | 210/741 |
| 5,155,324 A | 10/1992 | Deckard | |
| 5,398,193 A * | 3/1995 | deAngelis | 700/119 |

(Continued)

FOREIGN PATENT DOCUMENTS

| | | |
|---|---|---|
| DE | 3900973 | 6/1990 |
| DE | 102004024850 | 12/2005 |

(Continued)

OTHER PUBLICATIONS

European Office Action dated Oct. 5, 2012.

(Continued)

*Primary Examiner* — John Rivell
*Assistant Examiner* — Angelisa Hicks
(74) *Attorney, Agent, or Firm* — Nexsen Pruet, LLC (57) ABSTRACT

A filter assembly for an additive manufacturing apparatus has a housing defining a gas inlet and a gas outlet. A filter element is located within the housing between the gas inlet and the gas outlet. The assembly includes valves that can be actuated to seal the gas inlet and the gas outlet. Additionally the assembly has a fluid inlet for allowing ingress of a fluid into the housing. The assembly allows a filter element, which may contain volatile particles, to be changed safely. By sealing the gas inlet and outlet and flooding the housing with a suitable fluid, volatile particles captured by the filter can be neutralised.

19 Claims, 5 Drawing Sheets

(56) References Cited

U.S. PATENT DOCUMENTS

| | | | |
|---|---|---|---|
| 5,437,788 A * | 8/1995 | Geibel et al. | 210/333.01 |
| 5,460,733 A * | 10/1995 | Rasmussen et al. | 210/741 |
| 5,530,221 A | 6/1996 | Benda et al. | |
| 5,772,879 A | 6/1998 | Jaikaran | |
| 5,795,359 A | 8/1998 | McLeish et al. | |
| 6,926,760 B2 * | 8/2005 | Miebach | 95/279 |
| 7,168,935 B1 * | 1/2007 | Taminger et al. | 425/174.4 |
| 7,435,368 B2 * | 10/2008 | Davidson et al. | 264/113 |
| 2004/0153193 A1 * | 8/2004 | Farnworth | 700/120 |
| 2006/0192322 A1 | 8/2006 | Abe et al. | |

FOREIGN PATENT DOCUMENTS

| | | |
|---|---|---|
| DE | 102006012933 | 9/2007 |
| DE | 102007030860 | 11/2008 |
| JP | S60-179382 | 2/1987 |
| JP | H06-296815 | 10/1994 |
| JP | H06-072622 | 11/1994 |
| JP | 2002-131198 | 5/2002 |

OTHER PUBLICATIONS

IB, International Search Report, PCT/GB2009/002146, Jan. 3, 2010.

Notification of the First Office Action, European Patent Office, Apr. 17, 2013.

Notification of the First Office Action, State Intellectual Property Office of the People's Republic of China, Apr. 23, 2013.

Reasons for Rejection Notice, Japan Patent Office, Jun. 10, 2013; and translation of same.

* cited by examiner

FILTER ASSEMBLY

CROSS-REFERENCE TO RELATED APPLICATIONS

This U.S. National Stage Application arises from PCT/GB2009/002146, filed 7 Sep. 2009, which itself claims priority to GB Application Number 0816310.7, filed 5 Sep. 2008.

FIELD OF THE INVENTION

The invention relates to a filter assembly for an additive manufacturing apparatus such as a selective laser sintering (SLS) apparatus or a selective laser melting (SLM) apparatus.

BACKGROUND TO THE INVENTION

Additive manufacturing, rapid manufacturing or rapid prototyping methods for producing three-dimensional components are well known in the art (see for example U.S. Pat. No. 4,863,538—Deckard). There are various known methods of additive manufacturing including consolidation of powder materials and curing of polymeric resins (Stereolithography-SLA). SLM and SLS manufacturing methods involve a layer-by-layer consolidation of powder material using a focused energy beam, such as a laser beam or an electron beam.

In a typical selective SLS or SLM process, a thin layer of powder is deposited over a build area or powder bed within a SLS or SLM apparatus. A focused laser beam is scanned across portions of the powder layer that correspond to a cross-section of the three-dimensional article being constructed such that the powder at the points where the laser scans is consolidated either by sintering or by fusion. The cross-section is typically generated from a 3-D description of the component generated by scanning an original component or from computer-aided design (CAD) data.

After consolidation of a layer, the build surface is lowered by the thickness of the newly consolidated layer and a further layer of powder is spread over the surface. Again, the surface is irradiated with a laser beam in portions of the layer that correspond to a cross-section of the three-dimensional article, the newly consolidated layer being joined to the initial consolidated layer. This process is repeated until the component is completed.

When operating an additive manufacturing apparatus as described above a high powered laser heats the powder beyond its melting point resulting in formation of metal vapour in the atmosphere above the build surface. This metal vapour subsequently condenses forming powders with extremely small diameter e.g. diameters below 1 micron. At these diameters powders of most material types, particularly metals such as titanium, are highly reactive and liable to spontaneously combust on contact with air. The condensates usually appear as a "smoke" in the region above the build surface (build chamber) and some of this smoke is removed from the build chamber by a flow of inert gas through the build chamber.

Although it is relatively easy to trap such fine condensates within a filter element arranged in-line with the gas flow (where the collected residue resembles soot) there is a significant safety problem with the reactivity of the condensates. When changing filters, extreme care must be taken to prevent fires igniting within the filters on contact with air. Although a fire within a filter is a small fire, any fire near an apparatus containing metal powder or in a facility containing metal powder may act as to ignite a much larger and potentially serious fire. Therefore, deposits need to be treated with great care and collected in a safe manner in an inert atmosphere before being neutralised.

A prior art method of removing a used filter element from a filter assembly on an additive manufacturing machine involves the withdrawal of the filter element into a polythene bag associated with the filter assembly. The bag is then manually tied at two points on its length between the removed filter element and the filter assembly and cut between these two sealed points to remove the filter element without exposure to air. The bag containing the filter element is then placed in an airtight container and removed from the site to be disposed of. This prior art method leaves much room for human error, for example in safe sealing of the bag as it is removed.

SUMMARY OF INVENTION

The invention defines a filter assembly, an additive manufacturing apparatus and a method according to the appended independent claims to which reference should now be made. Preferred or advantageous features of the invention are defined in dependent subclaims.

In the first aspect the invention may provide a filter assembly, which may be termed a safe change filter assembly, for removing particulates from a gas stream. Preferably the filter assembly is for an additive manufacturing apparatus such as an SLM or SLS apparatus. The assembly comprises a filter housing having a gas inlet, gas outlet, and means for removably locating a filter element within the housing between the gas inlet and gas outlet. The filter assembly can be mounted in-line in a gas flow of an apparatus such that the filter element can filter particles from the gas. The assembly further comprises a valve actuatable to seal the gas inlet, a valve actuatable to seal the gas outlet and a fluid inlet for allowing ingress of a fluid into the housing. The fluid inlet is for allowing ingress of a fluid, preferably a neutralising fluid such as water, into the housing when the gas inlet and gas outlet valves have been sealed. The fluid inlet may have an associated valve to close the fluid inlet when the filter assembly is in use on an apparatus.

This filter assembly advantageously allows the fluid to displace the gas sealed within the housing when the valves of the gas inlet and gas outlet have been closed, and allows neutralisation of any volatile or explosive particulate matter within the filter housing.

Preferably the filter assembly is removably-mountable to an additive manufacturing apparatus, for example an SLM or SLS apparatus. This mounting may be achieved by means of quick release couplings at the gas inlet and the gas outlet which couple with pipes of a gas flow circuit of the apparatus. Any suitable means for coupling the assembly to a gas flow circuit could be used, for example screw fittings.

Advantageously, a removable filter assembly allows a filter element containing potentially volatile explosive particles to be sealed from the gas flow (by means of the valves at the gas inlet and gas outlet) and then removed from the vicinity of the apparatus for further processing.

The assembly may comprise a fluid outlet for allowing egress of fluid from the housing. Such an outlet is particularly advantageous where water is used as a neutralising fluid. Water can be pumped into the housing via the fluid inlet and allowed to continuously flow into the housing, simultaneously draining via the outlet. Potentially dangerous particulate matter may be removed from the housing in a safe state by the flow of liquid. Advantageously, a fluid outlet may allow gas within the housing to escape the housing when fluid is added through the inlet. A hose connection may transport such gas to escape beneath a layer of liquid so that any particulate matter in the gas is trapped in the liquid and does not escape to air.

If there is no fluid outlet then it is preferably that the housing incorporates some form of vent to facilitate release of gas from the housing when it is flooded with fluid.

Preferably the filter housing is divided into two sections by the filter element. I.e. there is preferably an upstream section that receives a contaminated gas flow from a gas inlet on one side of the filter element and a downstream section containing gas that has passed through the filter element on the other side of the filter element. Thus, it may be advantageous in this situation to have a first fluid inlet allowing ingress of the fluid to the upstream section of the housing and a second fluid inlet allowing fluid ingress to the downstream section of the housing. The use of two inlets arranged in this manner may make the process of neutralising the contaminated filter element by the fluid more efficient and more quickly achievable.

An assembly having a housing with an upstream section and a downstream section and first and second fluid inlets as described above may advantageously have first and second fluid outlets servicing both upstream and downstream sections of the housing (if a continuous flow of fluid is to be used to neutralise the particulate matter).

Preferably the filter assembly is arranged to receive a cylindrical filter element. Such filter elements are standard components for filtering purposes in many industries and particularly in automotive use. The assembly may be arranged with location members to fit the filter element within the housing, for example a spigot surrounding the gas outlet for receiving the open end of a cylindrical filter element.

Advantageously the housing may comprise a flow diverter for directing gas flow from the gas inlet to the filter element. Such a diverter is a particular advantage where the filter element is a cylindrical filter element. A gas diverter allows the gas stream to be diverted to the sides of a cylindrical filter element where it can pass directly through the filtering material.

The housing comprises means for removably locating a filter element. Advantageously the housing may be a modular housing having two separate portions. A first portion or upper portion may comprise the gas inlet and a second portion or lower portion may comprise the gas outlet. In such a case the first portion and the second portion would be openably-couplable to form the housing. The use of a two-part housing as described above allows access to a filter element located within the housing to replace the filter element, i.e. by separating the two portions of the housing. Preferably the act of coupling the two housing portions clamps a filter element between the portions and thus assists in its location within the housing.

In a further aspect the invention may provide an additive manufacturing apparatus for example an SLM or SLS apparatus comprising a filter assembly as described above. Such an additive manufacturing apparatus may have a build chamber for building an article and a gas flow circuit or gas flow circuits for passing a flow of gas through the build chamber, thereby removing particulate matter generated during the manufacturing process. The apparatus preferably comprises a filter assembly or assemblies as described above arranged to be in-line with the or each gas flow circuit. Advantageously the or each gas flow circuit may comprise a valve that is actuatable to seal the circuit upstream from the filter assembly prior to removal of the filter assembly from the apparatus. Likewise the or each gas flow circuit may further comprise a valve actuatable to seal the gas flow circuit downstream from the filter assembly prior to removal of the filter assembly from the apparatus. These additional valves associated with the apparatus may assist in maintaining the integrity of the gas in the gas flow circuit during removal of the filter assembly. Advantageously, this allows one filter assembly to be removed and replaced with a further filter assembly with minimal downtime to the machine.

Advantageously, the apparatus may comprise more than one filter assembly arranged within a gas flow. For example the apparatus may comprise first and second filter assemblies arranged in parallel within a gas flow circuit of the apparatus. This arrangement preferably allows each of the first and second filter assemblies to be separately removable from the apparatus to allow filter elements within the first and second filter assemblies to be independently changed. This arrangement may allow the filter elements within the first and second filter assemblies to be changed during operation of the apparatus by allowing first a filter element within the first filter assembly to be changed while the second filter assembly is in service, and then a filter element within the second filter assembly to be changed while the first is in service. Such a system may be of considerable advantage during a long manufacturing operation and may allow the manufacturing operation to be completed without interruption for a change of filter.

In a further aspect the invention may provide a method of changing a particle filter element located within a filter housing mounted to, for example, an is additive manufacturing apparatus. The method comprises the steps of a) closing a valve to seal a gas inlet to the housing and closing a valve to seal a valve outlet from the housing thereby completely sealing the housing, b) removing the housing from the apparatus, c) flooding the housing with a fluid, d) opening the housing, and e) replacing the filer element. Steps b) and c) can be performed in any order, for example the housing can be removed from the apparatus and then flooded with the fluid or alternatively can be flooded with a fluid while still attached to the apparatus and then removed from the apparatus. The fluid used to flood the housing is preferably a neutralising fluid for neutralising particulate material collected on the filtering within the filter housing. An example of a fluid that is often appropriate is water.

Preferably the filter housing is mounted in-line in a gas flow circuit of the apparatus and the method further comprises steps of closing valves to seal the gas flow circuit while the filter housing is removed from the apparatus.

The step of flooding the housing may comprise the steps of coupling an inlet to a fluid source, for example a source of water, opening an inlet valve, and passing fluid into the housing. It may be sufficient to flood the housing through the inlet and then either directly open the flooded housing or empty the flooded housing via the inlet before opening the housing. Alternatively the step of flooding may comprise the step of opening an outlet valve on a fluid outlet leading from the housing and allowing fluid to pass out of the housing. This additional step may allow a continuous flow of fluid through the housing. For example, the filter housing may be connected to a water supply via an inlet and the water may flow continuously through the housing for a period of time passing out of the outlet and in the process washing particulate matter from the housing. The fluid flow may then be terminated after a predetermined time and the housing then opened, or drained and opened.

Preferred embodiments of the invention will now be described with the aid of Figures in which.

Figure 1:
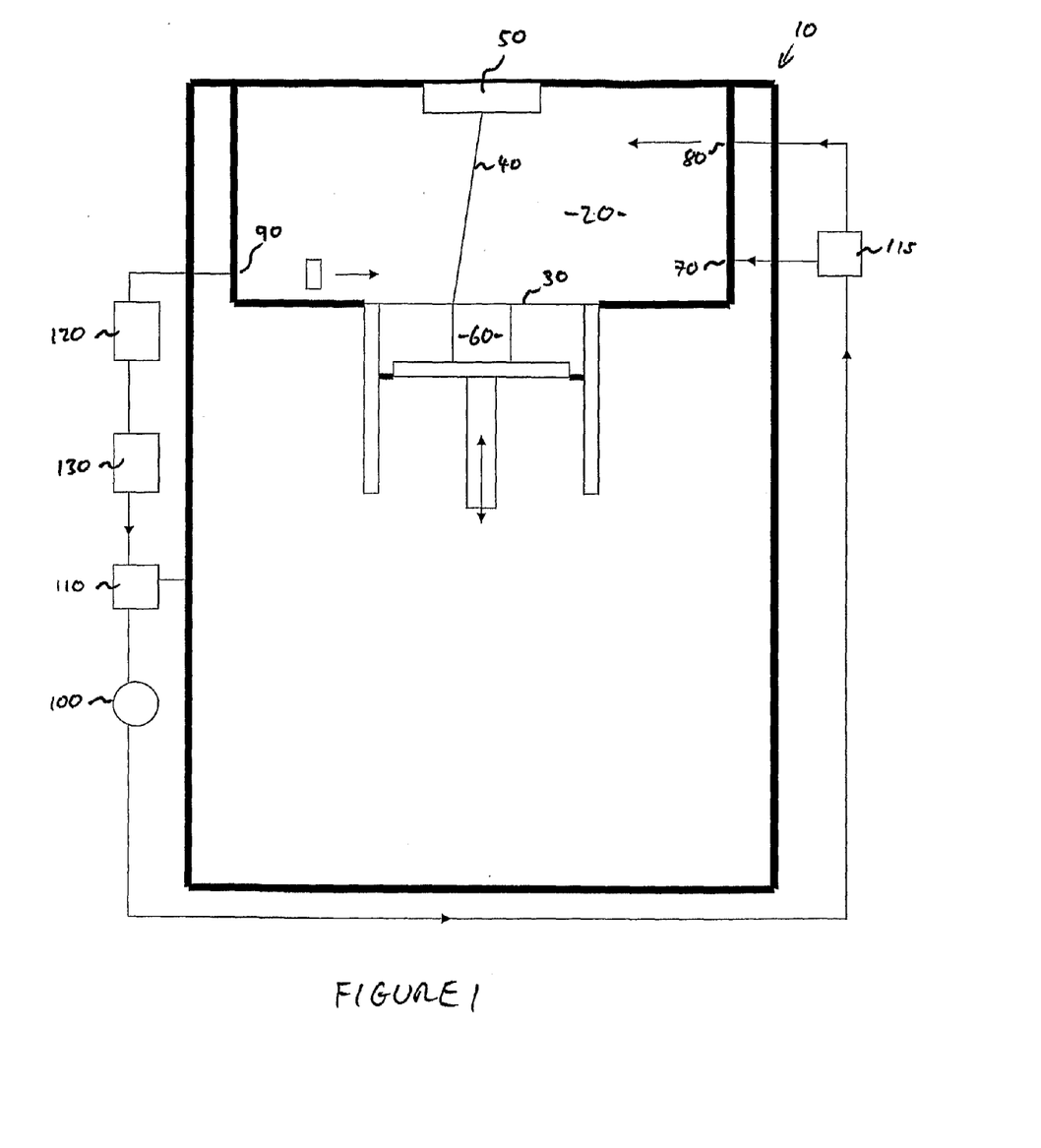
FIG. 1 is a schematic diagram of a selective laser melting apparatus showing the gas flow circuits for providing gas flow through the build chamber.

FIG. 1 is a diagram illustrating a selective laser melting (SLM) apparatus 10, for example an MTT Technologies SLM 250 machine. The apparatus has a build chamber 20 providing a controlled atmosphere over a build surface 30. Successive layers of powder are solidified by means of a laser beam 40 provided from a laser module 50 resulting in the build-up of a component 60. The build chamber 20 has a first gas flow inlet 70 for providing a gas shroud over the build surface and a second gas inlet 80 for providing a protective stream of gas at the roof of the build chamber to prevent soot build-up on the laser module 50. Gas pumped into the build chamber via these two inlets 70/80 is exhausted from the build chamber through exhaust 90. The exhausted gas contains particulate matter entrained in the gas stream as it passes through the build chamber.

A pump 100 maintains a flow of gas around the gas flow circuit (i.e. the circuit entering the build chamber at inlet 70, 80 and exhausted from the build chamber through exhaust 90). In addition to the pump, the gas flow circuit has valves for re-directing the gas flow 110, 115, a particulate filter for removing particulate matter from the gas stream 120, and a hepa filter 130. The filters, valves and pump are arranged in-line with the gas flow circuit.

The particulate filter 120 comprises a housing containing a filter element for removal of particulate matter entrained in the gas flow from the build chamber.

Figure 2:
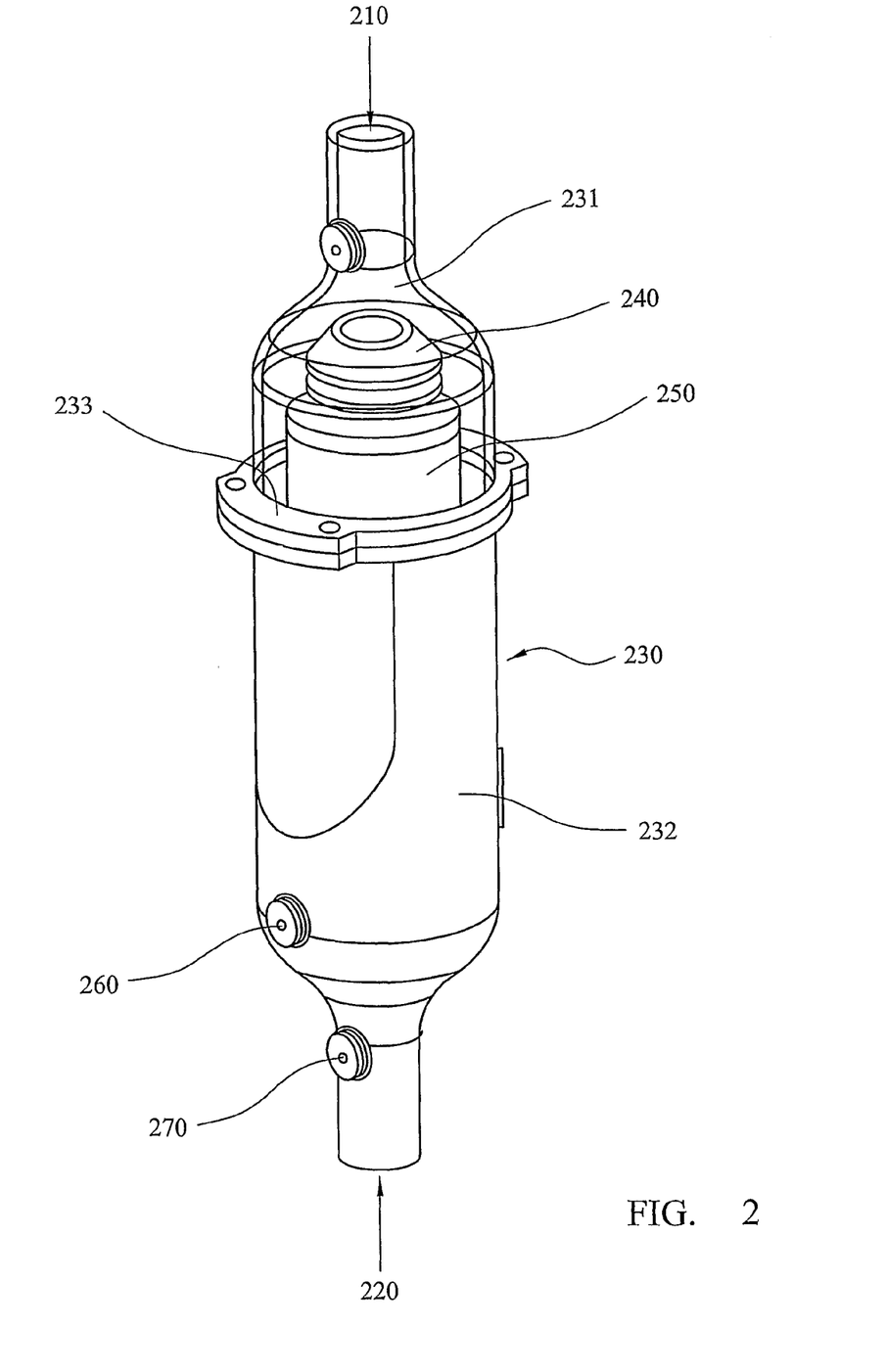
FIG. 2 is a perspective view of a filter assembly embodying the invention.

A filter assembly embodying the invention will now be described with reference to FIGS. 2 and 3.

The assembly has a gas inlet 210 couplable to the gas flow circuit downstream of the exhaust 90, and a gas outlet 220 downstream from the gas inlet and couplable to the gas flow circuit upstream of the hepa filter. The filter assembly comprises a filter housing 230 having separatable upper 231 and lower 232 portions. The upper portion is illustrated as transparent in FIG. 2 in order to clearly show the filter element and deflector inside. The housing is substantially cylindrical and the upper portion 231 and the lower portion 232 are securely clamped, when in use, at clamping rim 233. The clamping rim incorporates screws for affecting clamping of the two portions and an O-ring for sealing the housing when assembled.

A flow deflector 240 is incorporated in the upper portion 231 of the filter housing. The flow deflector 240 presses down on the end of and directs gas flow to the sides of a cylindrical filter element 250. The filter element is located by a spigot surrounding the gas outlet in the lower portion 232 of the housing and securely clamped in place by pressure exerted from the flow deflector 240 of the upper portion 231 when the housing is assembled.

The assembly has a dirty side water inlet 260 for supplying water to the filter housing upstream of the filter element (after the filter assembly has been sealed from the gas flow circuit). The assembly also has a clean side water inlet 270 on the clean side of the filter element, i.e. downstream of the filter element.

Once the filter element has been sealed by closing the gas inlet valve 281 and the gas outlet valve 282, water is pumped into the housing via the dirty side inlet and the clean side inlet 260, 270 to efficiently flood the housing on both sides of the filter element 250. This flooding with water entraps condensate and particulate matter held against the filter element and within the housing and neutralises these particles, thereby substantially eliminating the risk of explosion during removal of the filter element.

Figure 3:
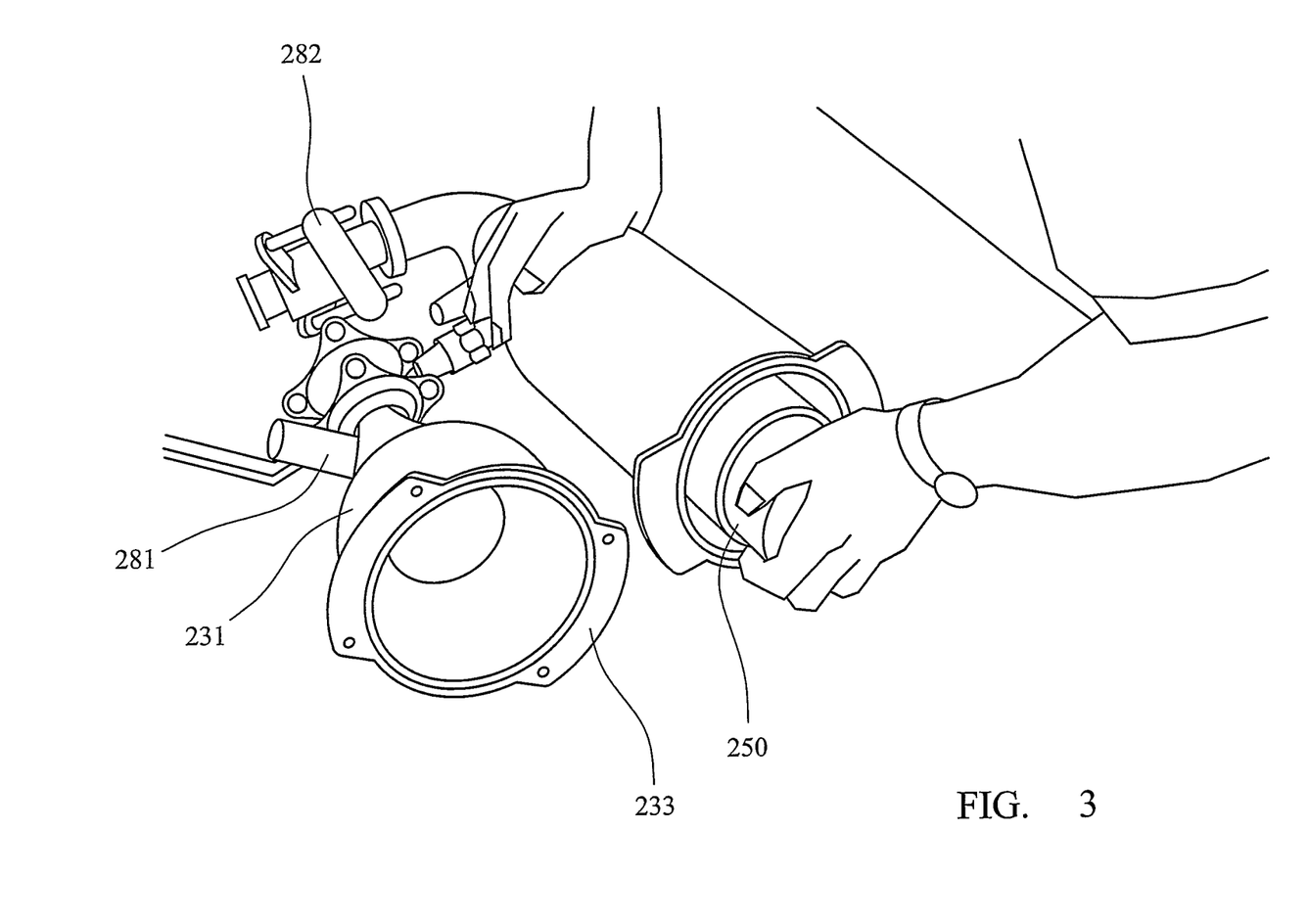
FIG. 3 is an illustration showing the filter assembly of FIG. 2 in the process of being loaded with a fresh filter element.

FIG. 3 illustrates the filter assembly in the process of being fitted with a filter element 250. The upper portion 231 has been separated from the lower portion 232 by removing clamping screws in the clamping rim 233. The filter element 250 is in the process of being fitted over a spigot in the lower portion of the housing. FIG. 3 illustrates a gas inlet valve assembly 281 and a gas outlet valve assembly 282 coupled to the housing to seal the housing from the machine's gas flow circuit prior to removal from the gas flow circuit and subsequent flooding with water.

Figure 4:
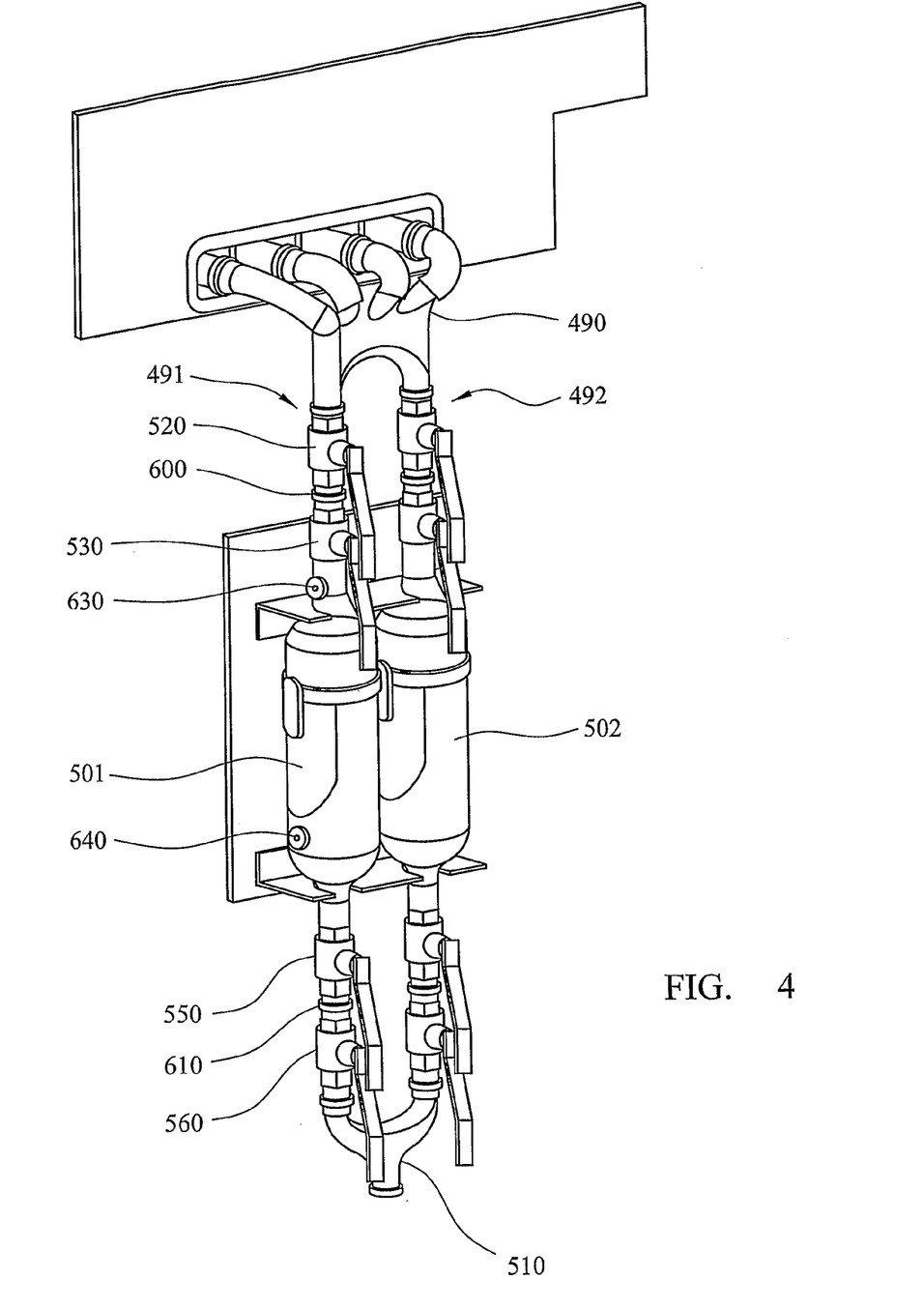
FIG. 4 is a perspective view illustrating a pair of filter assemblies embodying the invention mounted in parallel in a gas flow circuit.
Figure 5:
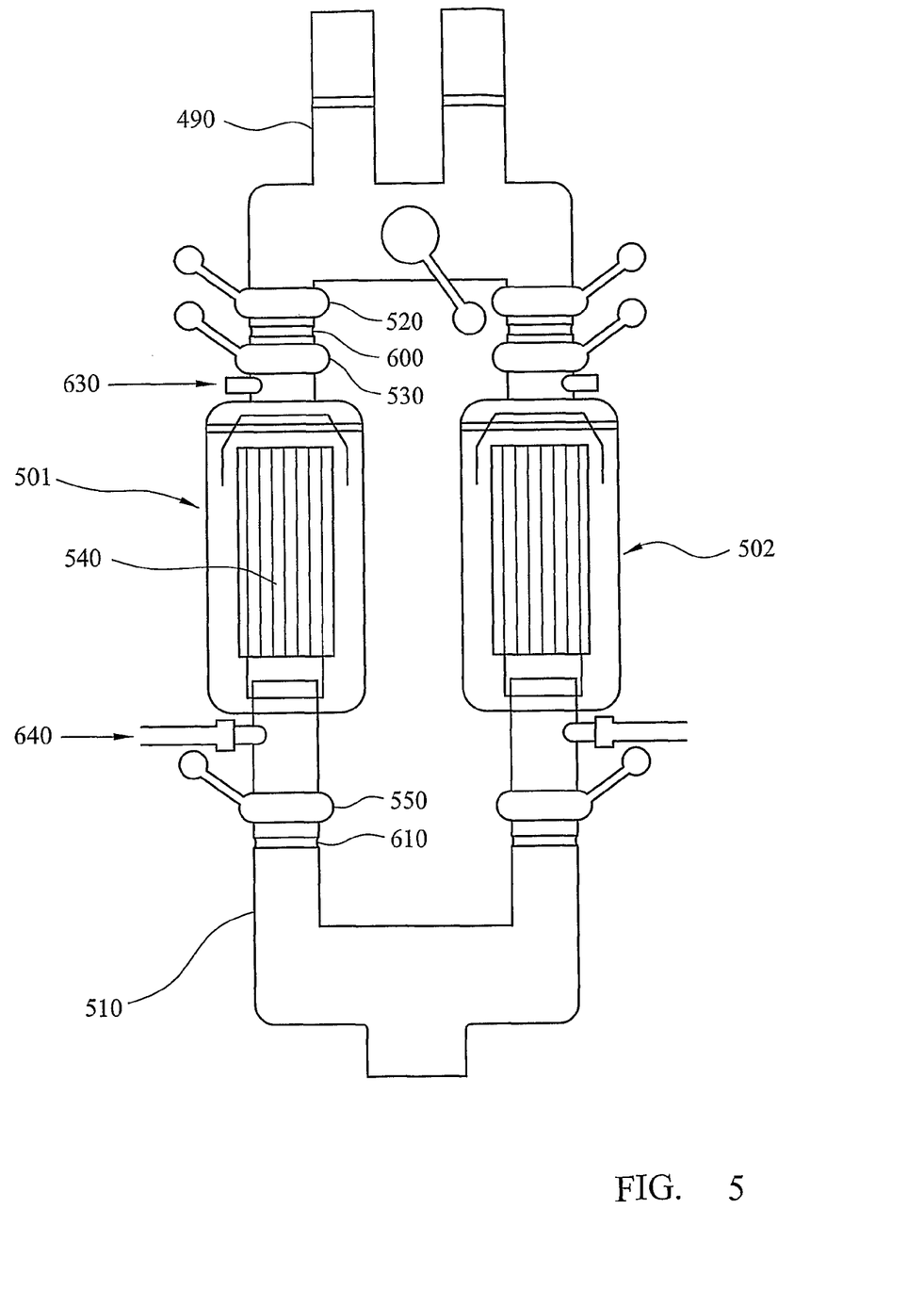
FIG. 5 is a schematic diagram illustrating the embodiment of FIG. 4.

FIGS. 4 and 5 illustrate an alternative embodiment of the invention in which two filter assemblies are mounted in parallel in-line with the gas flow circuit.

An exhaust manifold 490 transports gas from the build chamber of an SLM apparatus. The exhaust manifold splits the gas flow between two parallel lines 491 and 492. These parallel lines each run through a filter assembly 501, 502 and the flow is rejoined into a single line at T-junction 510.

As each flow-line between the exhaust manifold 490 and the T-junction 510 has identical components, only one will be described.

On passing into one of the two parallel lines, the gas flow passes through a first valve 520. This first valve 520 is actuatable to seal the gas line, i.e. to prevent further gas flow from the manifold through the filter 501.

Downstream from the first valve 520 is the filter assembly 501, which has a gas inlet valve 530 actuatable to seal the gas inlet side of the filter assembly. Gas passing through this gas inlet valve 530 passes into the filter housing 503 and passes through a filter element 540.

After passing through the filter element 540, the gas flow passes through gas outlet valve 550. The gas outlet valve 550 seals the gas outlet or downstream end of the filter assembly. Gas flow then passes through second gas circuit valve 560. The second gas circuit valve 560 is actuatable to seal the gas flow circuit from the external environment when the filter assembly is removed from the apparatus.

In between the first gas flow valve 520 and the gas inlet valve 530 there is a first quick fit coupling 600. Likewise, between the gas outlet 550 and the second gas circuit valve 560 there is a second quick fit coupling 610. When the first and second gas circuit valves 520, 560 and the gas inlet and gas outlet valves 530, 550 have been closed, the quick fit couplings 600, 610 can be released to allow removal of the filter assembly from the apparatus.

Although each of the parallel gas lines has the same components, the elements of the lines can be operated independently. Thus, the filter assembly 501 of the first gas line 491 can be removed while leaving the second filter assembly 502 on the second gas line 492 in place and operational.

It is noted that although quick release couplings are used in this embodiment, any suitable coupling, for instance screw couplings, could be used.

In use, both filter elements operate at the same time to filter particulates from the exhaust gas stream. The use of two filter assemblies arranged in parallel in a gas flow circuit allows filter elements to be changed during operation of the apparatus. This is achieved by closing first and second gas circuit valves 520, 560 and gas inlet and gas outlet valves 530, 550 on one of the two filter assemblies to seal that assembly from the gas flow circuit. This sealed filter assembly is then released from the apparatus by de-coupling from the circuit between the gas valves. The remaining filter assembly now carries all of the gas flow for the circuit.

The filter element of the removed filter assembly can either be replaced and the filter assembly returned to the apparatus, or a completely new filter assembly can be coupled to the apparatus.

To change the filter element, the filter housing is flooded using upstream and downstream water inlets 630, 640, as described above, to neutralise particulate matter contained within the housing. The filter housing can then be split to safely exchange the filter element.

It is preferable that elements of the gas flow circuit, particularly parts of the exhaust manifold 490 or the T-junction 510, and gas valves such as the first gas circuit gas valve 520, are independently removable by means of suitable joints in the circuit for cleaning and replacement.

The invention claimed is:

1. An additive manufacturing apparatus comprising:
a build chamber;
a module for providing a focused energy beam for consolidating layer-by-layer powder material in the build chamber to build an article;
a gas flow circuit for passing a flow of gas through the build chamber during the manufacturing process; and
a filter assembly;
the filter assembly comprising:
a filter housing having a gas inlet and a gas outlet for permitting gas flow in one direction from said inlet to said outlet, said housing being detachably coupled to the gas flow circuit such that the filter housing is removably-mountable to the additive manufacturing apparatus and a filter element located within the filter housing between the gas inlet and the gas outlet to, in use, filter volatile and/or explosive particles from the gas of the gas flow circuit;
the filter housing further comprising:
a first valve actuatable to seal the gas inlet and a second valve actuatable to seal the gas outlet, the filter housing arranged for allowing flow of a liquid through the filter housing in a direction opposite to said one direction for neutralizing the volatile and/or explosive particles trapped by the filter element and to remove the filter element.

2. An additive manufacturing apparatus according to claim 1, wherein the filter element is removably located within the filter housing.

3. An apparatus according to claim 1 in which the filter housing comprises, in addition to the gas inlet, a liquid inlet for allowing ingress of liquid into the filter housing.

4. An apparatus according to claim 1 further comprising, in addition to the gas outlet, a liquid outlet for allowing egress of fluid from the filter housing.

5. An apparatus according to claim 1 in which the filter element divides the filter housing into an upstream section and a downstream section, the filter housing comprising a first liquid inlet allowing ingress of fluid into the upstream section of the filter housing and the assembly further comprises a second liquid inlet allowing liquid ingress into the downstream section of the filter housing.

6. An apparatus according to claim 5 in which both upstream and downstream sections of the filter housing have liquid outlets.

7. An apparatus according to claim 1, wherein the filter housing comprises an upper portion, a lower portion and a clamp for clamping the upper and lower portions together, the upper and lower portions separable to allow access to the filter element within the housing.

8. An apparatus according to claim 1 in which the filter housing comprises a flow diverter for directing gas flow from the gas inlet to the filter element.

9. An apparatus according to claim 1 in which the filter housing has a first portion comprising the gas inlet and a second portion comprising the gas outlet, the first portion being couplable to the second portion.

10. An apparatus according to claim 9 in which the filter element is located by clamping between the first and second portions.

11. An apparatus according to claim 1 in which the gas flow circuit comprises a valve actuatable to seal the circuit upstream from the filter assembly prior to removal of the assembly.

12. An apparatus according to claim 1 in which the gas flow circuit further comprises a valve actuatable to seal the gas flow circuit downstream from the filter assembly prior to removal of the assembly.

13. An apparatus according to claim 1 comprising more than one filter assembly.

14. An apparatus according to claim 13, wherein first and second filter assemblies are arranged in parallel in the gas flow circuit of the apparatus such that each of the first and second filter assemblies is separately removable from the apparatus to allow filter elements to be changed during operation of the apparatus.

15. A method of changing a particle filter element located within a filter housing mounted on an additive manufacturing apparatus,
the additive manufacturing apparatus comprising:
a build chamber;
a module for providing a focussed energy beam for consolidating layer-by-layer powder material in the build chamber to build an article;
a gas flow circuit for passing a flow of gas through the build chamber during the manufacturing process;
the filter housing having a gas inlet and a gas outlet detachably couplable to the gas flow circuit such that, in use, the filter element filters volatile and/or explosive particles from the gas of the gas flow circuit,
the method comprising the steps of:
(a) closing a valve to seal the gas inlet to the filter housing and closing a valve to seal the gas outlet from the filter housing,
(b) removing the filter housing from the additive manufacturing apparatus, and
(c) flooding the filter housing with a liquid,
in which steps (b) and (c) can be performed in any order.

16. A method according to claim 15, comprising replacing the filter element.

17. A method according to claim 15, wherein the filter housing is removed from the additive manufacturing apparatus before flooding the filter housing with liquid.

18. A method according to claim 15 in which the step of flooding the filter housing comprises the steps of coupling an inlet in the filter housing to a liquid source, opening an inlet valve and passing liquid into the filter housing.

19. A method according to claim 15 in which the step of flooding the filter housing further comprises the step of opening an outlet valve on a liquid outlet leading from the filter housing and allowing liquid to pass out of the filter housing.

\* \* \* \* \*